United States Patent
Abbas

(10) Patent No.: US 9,391,842 B2
(45) Date of Patent: Jul. 12, 2016

(54) SELF-CONFIGURING TRANSPORT NETWORK

(75) Inventor: Ghani Abdul Muttalib Abbas, Nottingham (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 9 days.

(21) Appl. No.: 14/407,687

(22) PCT Filed: Jun. 15, 2012

(86) PCT No.: PCT/EP2012/061484
§ 371 (c)(1),
(2), (4) Date: Dec. 12, 2014

(87) PCT Pub. No.: WO2013/185842
PCT Pub. Date: Dec. 19, 2013

(65) Prior Publication Data
US 2015/0172125 A1    Jun. 18, 2015

(51) Int. Cl.
*H04L 12/24* (2006.01)
(52) U.S. Cl.
CPC ........ *H04L 41/0886* (2013.01); *H04L 41/0806* (2013.01); *H04L 41/0846* (2013.01); *H04L 41/0856* (2013.01); *H04L 41/12* (2013.01)
(58) Field of Classification Search
CPC ............ H04L 41/0806; H04L 41/0816; H04L 41/0853; H04L 41/0846; H04L 41/0856; H04L 41/0253; H04L 41/12; H04L 41/22; H04L 67/12; H04W 24/00–24/08; H04W 28/18; H04W 88/02; H04W 84/12; H04W 84/18

USPC .......................................................... 370/254
See application file for complete search history.

(56) References Cited

U.S. PATENT DOCUMENTS

| | | | | |
|---|---|---|---|---|
| 2005/0125492 | A1* | 6/2005 | Yu ...................... | H04L 41/0806 709/203 |
| 2005/0129051 | A1* | 6/2005 | Zhu ...................... | H04W 28/18 370/445 |
| 2009/0003336 | A1* | 1/2009 | Daines .................... | H04L 41/12 370/389 |
| 2009/0059814 | A1* | 3/2009 | Nixon .................... | H04L 41/12 370/254 |
| 2011/0143743 | A1* | 6/2011 | Pollakowski ......... | H04L 41/082 455/422.1 |
| 2014/0329528 | A1* | 11/2014 | Zhao .................... | H04W 36/30 455/436 |

OTHER PUBLICATIONS

"Draft Recommendation ITU-T G.8113.2/Y.1372.2 (for Consent on Sep. 16, 2011)," Dec. 5-16, 2011, 21 pages, International Telecommunication Union, Study Group 15, TD 478 (PLEN/15), Telecommunication Standardization Sector, Study Period 2009-2012.

(Continued)

*Primary Examiner* — Afsar M Qureshi
(74) *Attorney, Agent, or Firm* — NDWE LLP

(57) ABSTRACT

A method of configuring a network element in a transport network comprising interrogating components of the network element about their characteristic and exchanging information on characteristics of the network element and its components with neighboring network elements. The network element is configured based on the exchanged information.

12 Claims, 4 Drawing Sheets

1. Configure for linear protection on line side (param1; param2)
2. ACK (param3; param4)

(56) References Cited

OTHER PUBLICATIONS

"Operations, Administration and Maintenance mechanism for MPLS-TP in Packet Transport Network (PIN)," May 2012, 41 pages, Plenary Meeting, Document 40-E, Study Group 15, Optical transport networks and access network infrastructures, Draft New Recommendation ITU-T G.8113.1 Proposed for Approval at the World Telecommunication Standardization Assembly (WTSA-12), Nov. 20-29, 2012.

International Preliminary Report on Patentability, Application No. PCT/EP2012/061484, dated Dec. 16, 2014, 7 pages.

PCT International Search Report for PCT Counterpart Application No. PCT/EP2012/061484, (Mar. 6, 2013), 3 pages.

*ITU-T G.805*, "Generic functional architecture of transport networks", Series G: Transmission Systems and Media, Digital Systems and Networks, Digital networks—General aspects, (Mar. 2000), 58 pages.

*ITU-T G.8013/Y.1731*, "OAM functions and mechanisms for Ethernet based networks", Series G: Transmission Systems and Media, Digital Systems and Networks, Packet over Transport aspects—Ethernet over Transport aspects, Series Y: Global Information Infrastructure, Internet Protocol Aspects and Next-Generation Netwo, (Nov. 2013), 99 pages.

*ITU-T G.8113.2/Y.1372.2*, "Operations, administration and maintenance mechanisms for MPLS-TP networks using the tools defined for MPLS", Series G: Transmission Systems and Media, Digital Systems and Networks, Packet over Transport aspects—MPLS over Transport aspects; Series Y: Global Information Infrastructure, Internet Protocol Aspects and Next-Generation Netwo, (Nov. 2012), 30 pages.

\* cited by examiner

1. Configure for linear protection on line side (param1; param2)
2. ACK (param3; param4)

US 9,391,842 B2

SELF-CONFIGURING TRANSPORT NETWORK

CROSS-REFERENCE TO RELATED APPLICATIONS

This application is a National stage of International Application No. PCT/EP2012/061484, filed Jun. 15, 2012, which is hereby incorporated by reference.

TECHNICAL FIELD

The present invention relates to transport networks in communications systems, in general, and in particular to self configuration of network elements in transport networks.

BACKGROUND

Currently provisioning and configuring transport equipment in telecommunications networks is time consuming and costly as it requires provisioning and configuration for various protection schemes and monitoring. Although some elements of configuration can be automated, e.g. neighbour discovery and determining of network topology, in order to make a network element in a transport network fully operational manual work of a field engineer configuring this element is still required.

SUMMARY

It is the object of the present invention to obviate at least some of the above disadvantages and provide an improved method of configuring a network element in a transport network and a network element for implementing this method.

According to a first aspect of the present invention there is provided a method of configuring a network element in a transport network. The method comprises interrogating components of the network element to determine their characteristics. The characteristics are then saved in an inventory module. The method also comprises sending to a neighbour network element at least part of the information stored in the inventory module and receiving from the neighbour network element information about said neighbour element. When the information is exchanged between the network elements the method comprises configuring at least one of said components based on the information received from the neighbour network element.

According to a second aspect of the present invention there is provided a network element for use in a transport network. The network element comprises an inventory module communicatively connected to a processor. The processor, it turn, is communicatively connected to components of the network element. The inventory module is adapted to store information about the network element and said components of the network element. Said processor is adapted to send to a neighbour network element at least part of the information stored in the inventory module and to receive from the neighbour network element information about said neighbour element. The network element further comprises an interface for communication with the neighbour network element. Said processor being adapted to configure at least one of said components based on the information received from the neighbour network element.

According to a third aspect of the present invention there is provided a transport network comprising network elements as defined above.

Further features of the present invention are as claimed in the dependent claims.

The present invention provides the benefit of speeding up provisioning of services as well as reducing the network operational expenditure. A self organizing network also minimizes the lifecycle cost of running a network by eliminating manual configuration of equipment at the time of deployment, right through to dynamically optimizing its operation, service availability and performance.

BRIEF DESCRIPTION OF THE DRAWINGS

The present invention will be understood and appreciated more fully from the following detailed description taken in conjunction with the drawings in which.

DETAILED DESCRIPTION

The embodiments of the present invention are described in the context of a transport network as defined in ITU-T recommendation G.805. A transport network (also known as transport plane, transport layer/layers or data plane) provides transfer of user information from one location to another. For transmitting control information, i.e. signalling, to perform resource and connection management a control plane is used. Finally a management plane performs configuration and performance management and interfacing with the Control Plane. These terms and relations between them are well known to a person skilled in the art and will not be discussed here.

In a transport network provisioning and configuration for various protection schemes and monitoring is traditionally performed manually by engineering staff of a network operator. However, with ever increasing size of communications network caused by increasing demand for access to the Internet and various network services the amount of data transported is growing all the time. Operating large networks with hundreds or thousands of nodes, adding new nodes to the network and configuring them is expensive and time consuming task. The present invention discloses a solution that allows for a transport network to be realised using self-configuring and self-optimizing devices. A number of network devices connected and cooperating, as disclosed in embodiments now to be described, are adapted to set up a correctly functioning network with no human intervention (or at least with human intervention very much limited).

Figure 2:
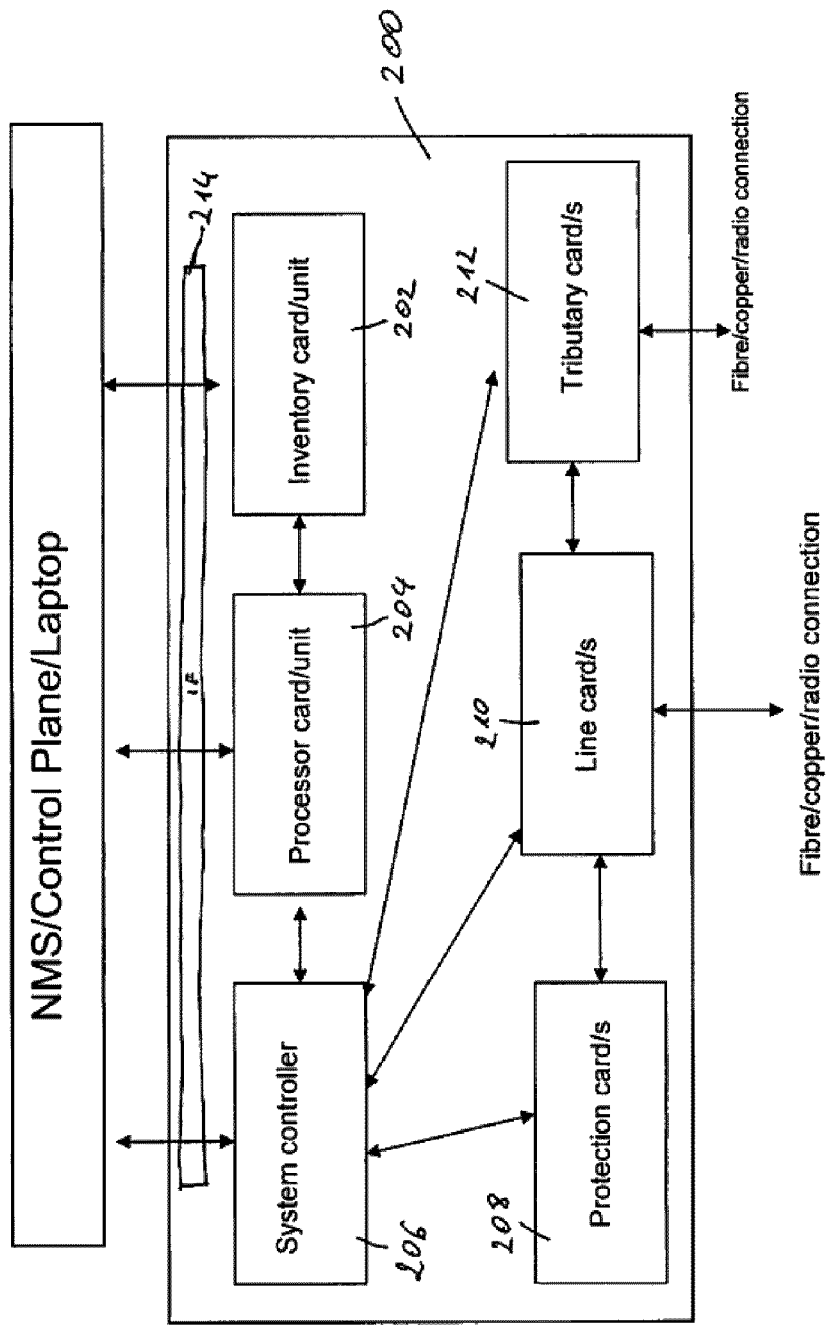
FIG. 2 is a diagram illustrating a network element in one embodiment of the present invention.
Figure 3:
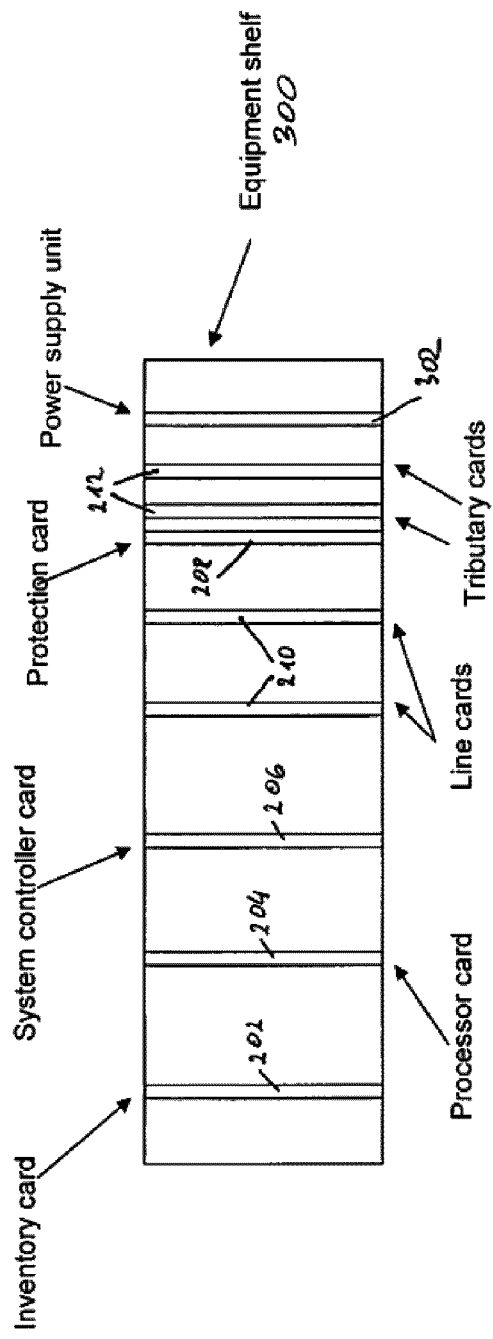
FIG. 3 is a diagram illustrating a shelf in a rack of a network element in one embodiment of the present invention.
Figure 4:
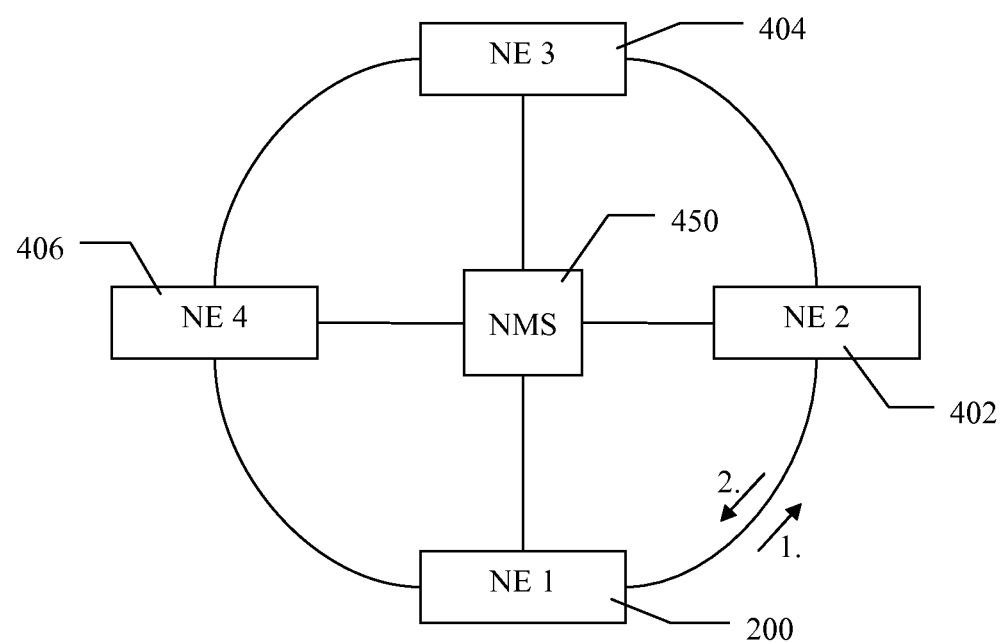
FIG. 4 is a diagram illustrating a transport network in one embodiment of the present invention.

In one embodiment a network element 200, illustrated in FIG. 2, for use in a transport network 400 illustrated in FIG. 4 comprises an inventory module, 202, that is connected to a processor, 204. In one embodiment the inventory module, 202, and the processor, 204, are implemented separately as an inventory card and a processor card that are mounted in a rack or shelf, 300, of a network element, as shown in an example embodiment illustrated in FIG. 3. In an alternative embodiment the inventory module 202 and the processor 204 are implemented in one hardware component, for example a card.

Figure 1:
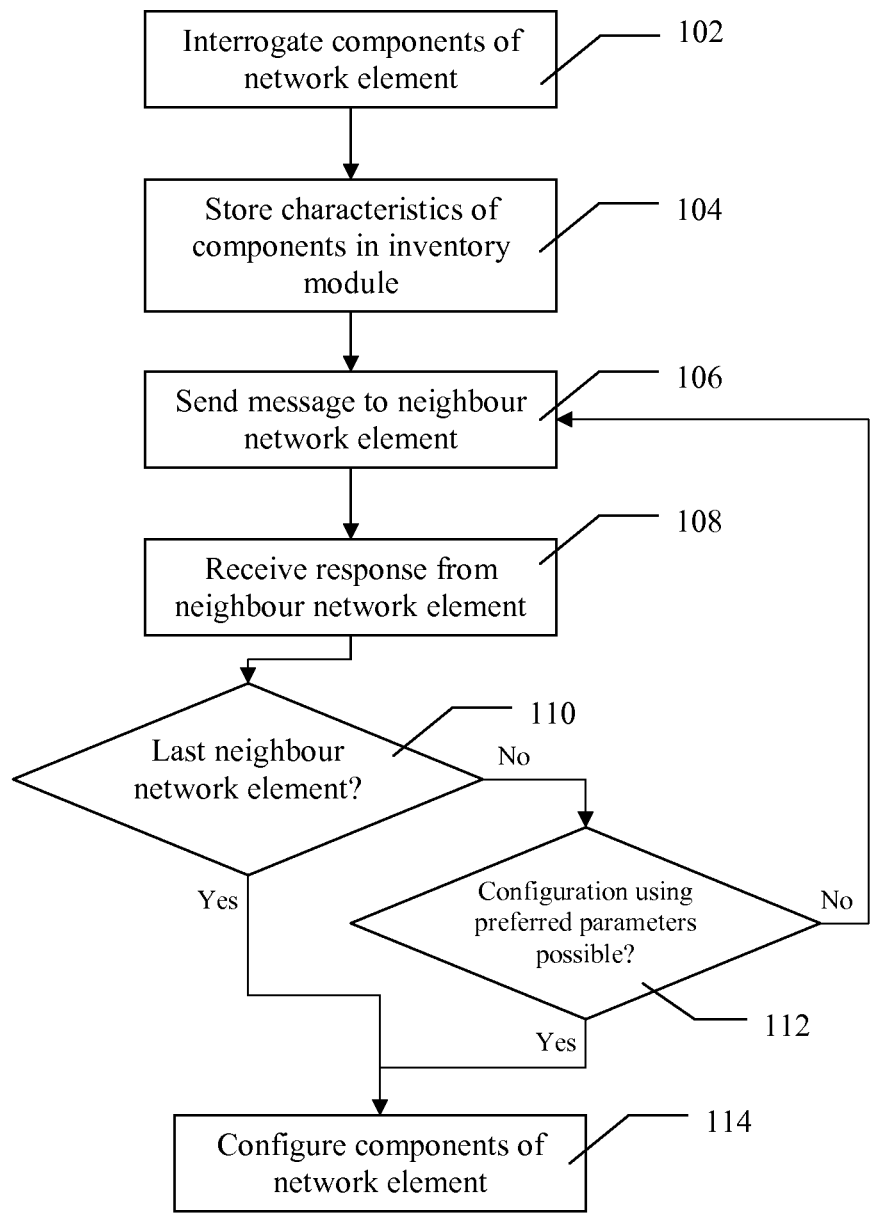
FIG. 1 is a diagram illustrating a method of configuring a network element in a transport network in one embodiment of the present invention.

The processor 204 is responsible for configuration of the various components of the network element of a transport network 400. In the embodiment illustrated in FIG. 3 these components include protection card 208, line cards 210 and tributary cards 212. However, the number and types of cards (or other hardware components) installed in a network element will be different for different types of network elements. In order to perform the configuration of these various components, 208, 210, 212, the processor is communicatively connected to these hardware components. The function of the inventory module 202 is to save, 104, information about the network element, 200, and its components 208, 210, 212. Preferably the inventory element obtains information about components installed in the network element by interrogating, 102, these components when said components are added to the network element. For example, as illustrated in embodiment of the method shown in FIG. 1, when a new line card 210 is installed on the shelf 300 the inventory module 202 interrogates 102 the newly inserted line card in order to obtain characteristics of this line card. For example, the inventory card may require the type of the line card, its code, bit rate it operates at or the type and architecture of protection switching it can support.

The line card (or any other card interrogated by the inventory card) may respond with the required information or, in an alternative embodiment, the card may identify its type and version and the inventory card obtains the required characteristics from a remote resource (e.g. manufacturer's database for some physical parameters of the card and/or a Network Management System for specific settings of the card as defined by network operator) and stores, 104, this information in a memory.

In yet another embodiment it may be that the inventory card 202 is installed (retrofitted) in the shelf 300 of the network element 200. In this situation the inventory card 202 interrogates the already present components of the network element 200 and stores, 104, the obtained information in its memory.

The processor 204 sends, 106, to a neighbour network element, 402, 406, at least part of the information stored in the inventory module 202 and receives, 108, from the neighbour network element, 402, 406, information about said neighbour element as illustrated in FIG. 4.

In embodiments of the present invention the network element 200 comprises an interface, 214, that is used by the processor, 204, for communication, 106 and 108, with the neighbour network element 402 via signalling over an in-band channel of a transport plane. The advantage of using in-band signalling is that there is no need for a dedicated channel to be used in such a self-configuration and as a result resources (bandwidth) are not consumed. Furthermore, in some applications an external out-of-band channel may not be available at every node in the network.

Once the processor 204 has the necessary information about neighbour network element(s) and also information about the various components installed in its own network element the processor can configure, 114, components that require configuration based on the information exchanged with the neighbouring node or nodes. In the simple example shown in FIG. 4 the processor 204 of the network element 200 wants to set-up linear protection on the line side and in order to achieve that it starts a dialogue with its neighbour network element by sending message 1: I want to configure linear protection on the line side (parameter 1; parameter 2). The parameters in the message are necessary for the neighbour network element 402 in order to configure linear protection. The neighbour network element 402 responds to message 1 and sends message 2 that reads: ACK (parameter 3; parameter 4). In this way the neighbour network element 402 acknowledged receipt of message 1 and by including its parameters confirmed the set-up of the linear protection. If the parameters returned in message 2 match the parameters sent in message 1 it means that the linear protection (or any other feature configured in this way) may be configured using the parameters requested by the network element 200. The dialog presented above is very simple and in a real life network implementation it may be more complicated. For example, the neighbour network element 402 may not be capable of implementing specific functions requested by network element 200 because of different version of software or hardware. For example, the network element 200 may have requested a connection encrypted using 256 bit key and the neighbour network element 402 only supports encryption using 128 bit key. In this situation the neighbour network element 402 in the response declines using 256 bit encryption and instead offers 128 bit encryption. When such response is received the network element 200 may accept the 128 bit encryption instead of its preferred 256 bit encryption or send additional message 1 as described above to another neighbour network element in an attempt to configure the connection using its preferred encryption parameter.

Returning to the example shown in FIG. 4, when the parameters for the linear protection are exchanged, the processor 204 sends a message (or messages) to the system controller 206 in the network element 200 requesting the system controller 206 to configure the protection card(s) for such an operation using the agreed parameters. In one embodiment the processor 204 also sends a message to the system controller 206 instructing the system controller to set-up monitoring points and/or monitoring ports in the network element.

Similar operations leading to configuration of linear protection are performed in the neighbour network element 402.

It is, however, possible that the processor 204, when adequately programmed takes over the function of the system controller 206 and in this embodiment the network element does not have a separate, dedicated system controller module.

In addition to the given example of linear protection the network element 200 may, by exchanging parameters with the neighbour network element, configure also synchronisation feeds, time slots, wavelength assignments for cards (line cards or tributary cards) added to the network element 200 using the information received from the neighbour network element 402. Although in the embodiment described above a new card(s) has been added and needs configuring the same teaching is applicable to any other situation that introduced change in the network affecting the network element 200 which requires (or would benefit from) configuration or reconfiguration, for example software upgrade in one or more of the modules 202-214 of the network element, or failure of a network element or a link between network elements.

In an alternative embodiment if the neighbour network element 402 declines configuration based on parameters required by the network element 200, or does not acknowledge receipt of the message 1 in a specified time, the network element 200 may attempt configuration with a second neighbour network element 406. In this embodiment the network element 200 checks if configuration using its preferred parameters (i.e. parameters sent in message 1 as illustrated in FIG. 4) is possible, 112, and initiating communication with a second neighbour network element if the configuration using the preferred parameters is not possible. Network elements usually have more than one neighbour and this embodiment allows for selecting the best configuration available from the neighbouring network elements rather than being limited to the best configuration that can be offered by the first neighbour network element contacted. If there are no more neighbour network elements, 110, the network element 200 configures 114 its components using parameters received from a neighbour network element being closest to the preferred parameters.

In one embodiment the information exchanged between neighbour network elements is used to determine topology of the transport network 400. In this embodiment a configured and operating network element has knowledge about topology of the network it operates in. If, however, a new network element is added, or a new line or tributary card is added to the existing network element the topology of the network changes. Sharing information about network elements and links (both physical and logical) connecting the network elements results in determining topology of the network changed as a result of the addition or removal of a network element or a card to an existing network element. Discovering topology may be implemented by sending unique Link Layer Discovery Protocol packets (LLDP). LLDP is a neighbour discovery protocol in which network elements advertise information about themselves to neighbours on the same physical network. Unique LLDP packets are sent when a physical layer interface becomes available, i.e. when a radio or a transmission link is established, a cable or an optic fibre is connected. To detect the topology the LLDP packet is sent from each port and when received at connected port the advertised information about the sending network element, port and link determined from the LLDP packet is added to the existing topology information already stored at Management Information Base (MIB). There may be distributed MIBs at network elements and a centralised entity that accesses the distributed MIBs in order to build a complete topology and inventory of the network.

In one embodiment the processor 204 of the network element 200 may configure maintenance entity points (MEP) or maintenance intermediate points (MIP) of the network element 200 using the information received from the neighbour network element. MEPs and MIPs are commonly known as Maintenance Entities (MEs) and their function is to monitor the network for irregular behaviour suggesting a fault in the network or degradation of the services. In a ring network when a MEP or MIP does not detect any defect then it sends messages in both directions of the ring indicating that there is no need to switch the traffic. If, however, a MEP or MIP detects an error then it sends in both directions of the ring a message requesting creation of a detour of the fault. In one embodiment the MEPs and MIPs monitor the state of a section between adjacent nodes using a predefined OAM (operation and maintenance) mechanism. For a MPLS-TP (Multiprotocol Label Switching-Transport Profile) network the OAM mechanism used may be the one defined in ITU-T recommendation G.8113 series. However, alternative OAM mechanisms may be used and also other transport technologies than MPLS-TP such as Ethernet or optical transport technology may be used in the network. Similarly, the invention in its various embodiments is applicable to various network topologies other than ring topology.

Although not required, in an embodiment of the invention the network element 200 sends the implemented configuration settings to a network management system 450. This is to provide the operator with information about the current settings and configuration in the network.

The invention claimed is:

1. A method of configuring a network element in a transport network comprising:
   interrogating components of the network element about their characteristic;
   saving the characteristics in an inventory module;
   sending to a neighbour network element at least part of information stored in the inventory module;
   receiving from the neighbour network element information about said neighbour network element; and
   configuring at least one of said components based on the information received from the neighbour network element.

2. The method according to claim 1, further comprising interrogating a remote database to obtain information related to the characteristics of the components of the network element.

3. The method according to claim 1, further comprising repeating the steps of sending and receiving for other neighbour network elements, wherein the step of configuring comprises selecting configuration parameters from the information received from the neighbour network elements.

4. The method according to claim 1, further comprising determining topology of the transport network using the information received from the neighbour network element.

5. The method according to claim 1, further comprising configuring in the network element a maintenance entity point or a maintenance intermediate point using the information received from the neighbour network element.

6. The method according to claim 1, further comprising configuring in the network element synchronisation feeds and/or time slots and/or wavelength assignments and/or protection using the information received from the neighbour network element.

7. The method according to claim 1, further comprising sending implemented configuration settings to a network management system.

8. The method according to claim 1, wherein the steps of sending and receiving information use signalling over an in-band channel of the transport network.

9. A network element for use in a transport network, the network element comprising an inventory module communicatively coupled to a processor, the processor being communicatively coupled to components of the network element, wherein the inventory module is adapted to store information about the network element and said components of the network element, wherein said processor is adapted to send to a neighbour network element at least part of the information stored in the inventory module and to receive from the neighbour network element information about said neighbour network element, the network element further comprising an interface for communicating with the neighbour network element; said processor being adapted to configure at least one of said components based on the information received from the neighbour network element.

10. The network element according to claim 9, wherein the network element further comprises a system controller for communicating between the processor and the components of the network element.

11. The network element according to claim 9, wherein the components of the network element are tributary card and/or line cards.

12. A transport network comprising a network element, the network element comprising an inventory module communicatively coupled to a processor, the processor being communicatively coupled to components of the network element, wherein the inventory module is adapted to store information about the network element and said components of the network element, wherein said processor is adapted to send to a neighbour network element at least part of the information stored in the inventory module and to receive from the neighbour network element information about said neighbour network element, the network element further comprising an interface for communicating with the neighbour network element; said processor being adapted to configure at least one of said components based on the information received from the neighbour network element.

* * * * *